Dec. 4, 1945.   M. RONNING ET AL   2,390,273
COMBINE STEERING MECHANISM
Filed April 8, 1944   3 Sheets-Sheet 1
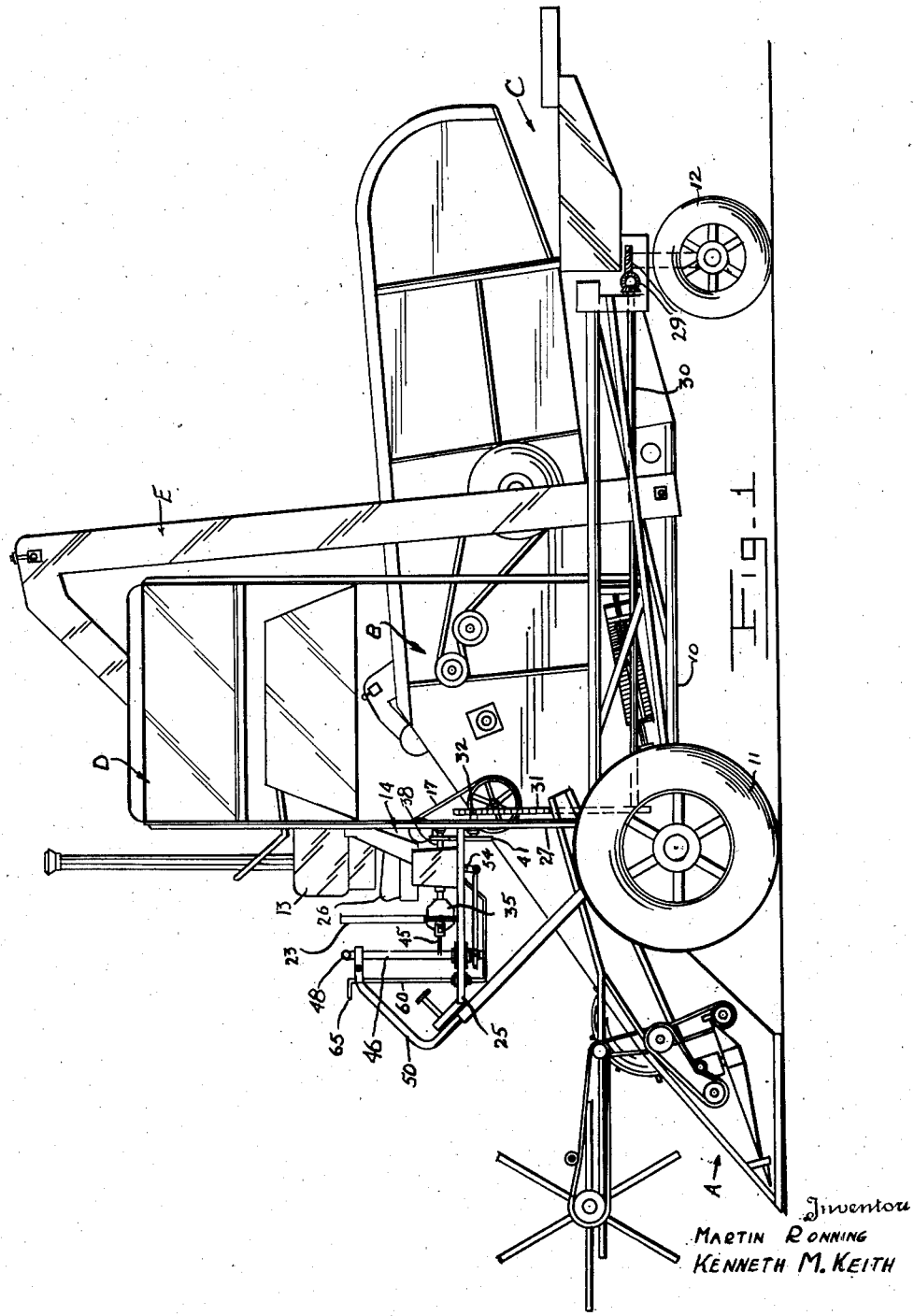
Inventors
MARTIN RONNING
KENNETH M. KEITH
By Carlsen & Hazle
Attorneys Dec. 4, 1945.                M. RONNING ET AL                2,390,273
                       COMBINE STEERING MECHANISM
                       Filed April 8, 1944          3 Sheets-Sheet 2
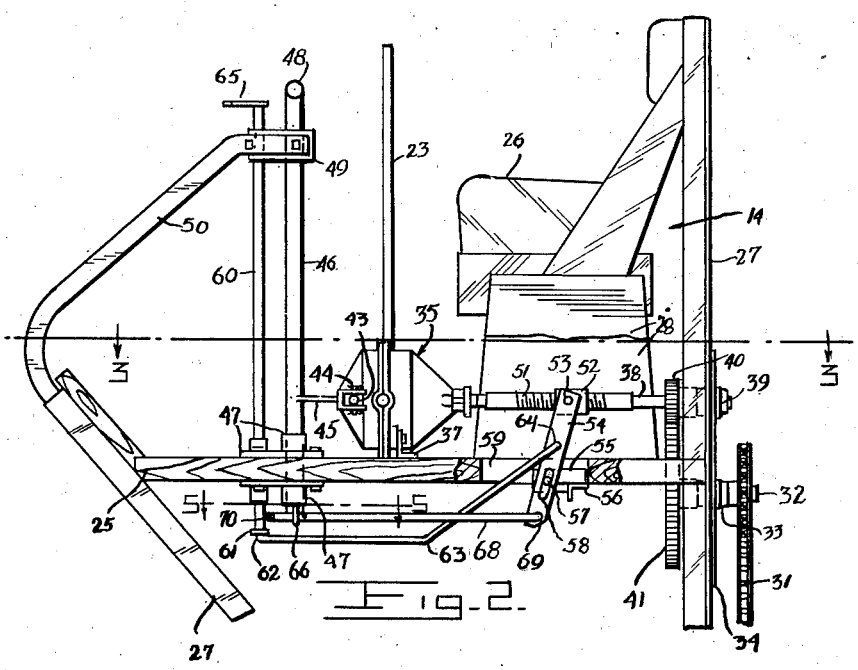
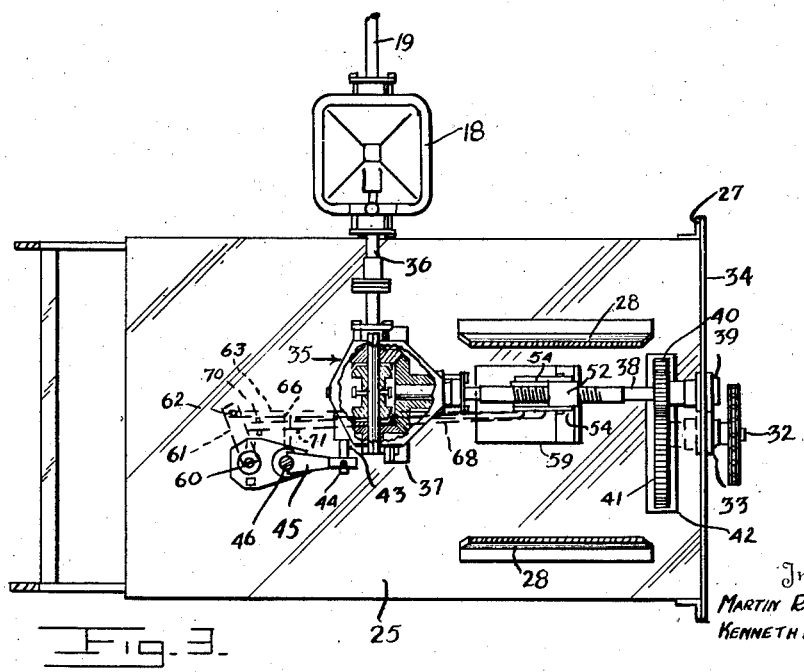
Inventors
MARTIN RONNING
KENNETH M. KEITH
By Carlsen + Hazle
                Attorneys Dec. 4, 1945.  M. RONNING ET AL  2,390,273
COMBINE STEERING MECHANISM
Filed April 8, 1944  3 Sheets-Sheet 3

Inventors
MARTIN RONNING
KENNETH M. KEITH

By Carlsen & Hazle
Attorneys

Patented Dec. 4, 1945

2,390,273

UNITED STATES PATENT OFFICE 2,390,273

COMBINE STEERING MECHANISM

Martin Ronning, St. Louis Park, and Kenneth M. Keith, Minneapolis, Minn., assignors to Minneapolis-Moline Power Implement Company, Minneapolis, Minn., a corporation of Delaware Application April 8, 1944, Serial No. 530,088

4 Claims. (Cl. 180—79.3)

This invention relates to steering mechanism for grain combines, or combined harvesting and threshing machines.

The primary object of our invention is to provide power actuated steering means, for self-propelled combines, of such nature that the force necessary for effecting steering movements of the ground wheels is taken from the engine or power plant propelling and operating the machine, under the control of a steering member which may be readily adjusted by hand. The operator is thus relieved of the necessity for exerting sufficient force for actually angling the wheels, which in the case of large machines of this kind is considerable and very tiring.

Another object is to provide steering mechanism for a combine, which is steered under control of a rear steering truck, including means for indicating at all times the direction of travel of the combine, so that in starting up from a standing position, the operator will be able to tell the direction, whether straight ahead or to either side, in which the machine will travel. The rearwardly located steering truck is necessarily hidden from the view of the operator, and without a direction indicator of this nature he would, of course, be unable to determine at what angle this truck might be standing.

A further object is to provide means for automatically releasing or disengaging the power steering mechanism from the power plant when the steering truck has been angled in either direction as far as practicable, and to override the manual control in so doing, so that the operator cannot accidentally or carelessly angle the truck to a dangerous degree.

These and other more detailed and specific objects will be disclosed in the course of the following specification, reference being had to the accompanying drawings, in which—

Fig. 1 is a side elevation of a self-propelled combine equipped with our power steering mechanism.

Fig. 2 is an enlarged fragmentary side elevation, partially in section, of the operator's station on the combine, showing the power steering mechanism in more detail.

Fig. 3 is a horizontal sectional view along the line 3—3 in Fig. 2.

Figure 4:
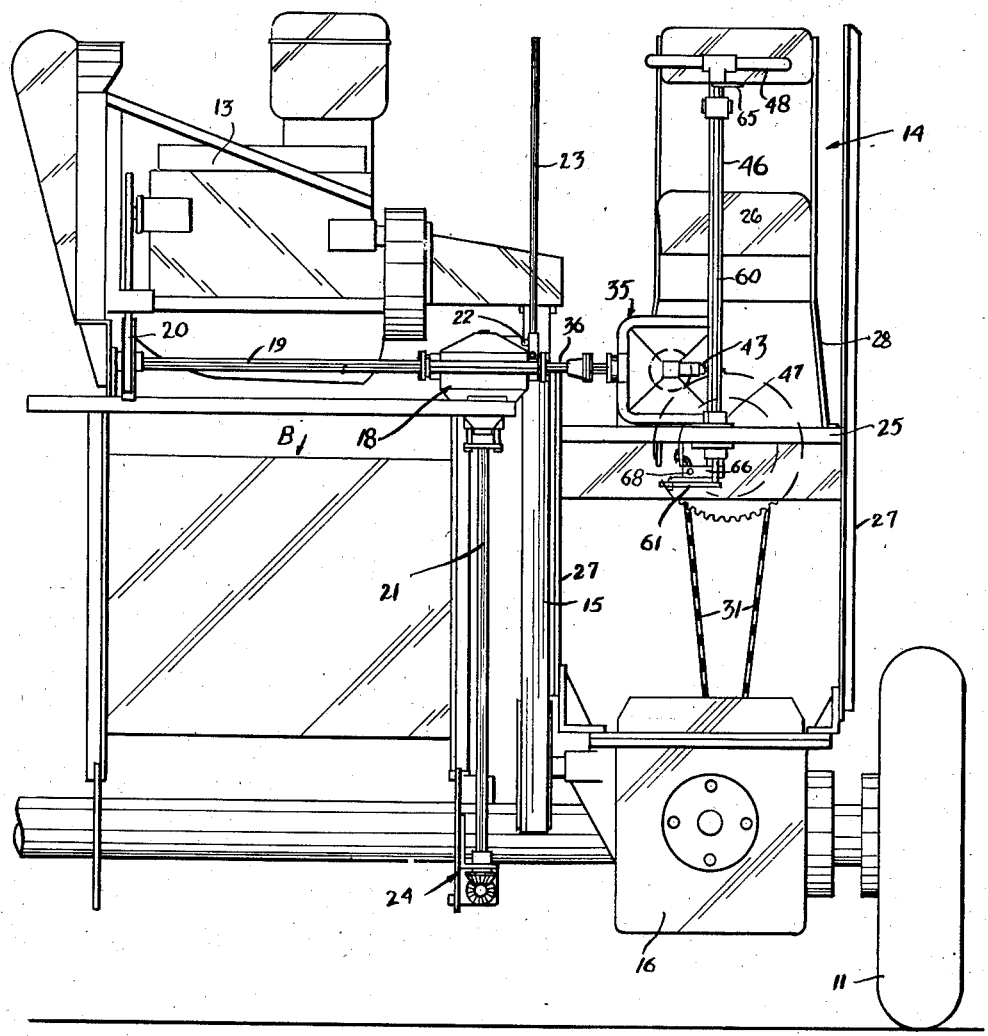
Fig. 4 is an enlarged, fragmentary frontal elevation of the operator's station, steering mechanism, power plant and associated parts.
Figure 5:
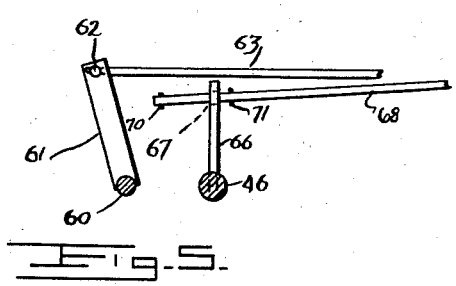
Fig. 5 is an enlarged horizontal sectional view along the line 5—5 in Fig. 2.

Referring to the drawings more particularly and by reference characters, 10 designates the main frame of the combine, the same being supported upon widely spaced forward driving wheels 11 and by a rearwardly located, narrow, dirigible steering truck 12. A power plant or engine 13 provides power for propelling the wheels 11 as well as operating the various harvesting, threshing and conveying elements of the machine. All controls are arranged at an operator's station, designated generally at 14.

The combine itself comprises a harvester A which cuts the grain as the machine advances over the field, and a thresher B which separates the grain from the chaff and straw, the latter being discharged at the rear end C of the thresher housing, while the cleaned grain is elevated to a grain tank D by elevator E.

A machine of this nature is disclosed in detail in our co-pending application Serial No. 511,054, filed November 20, 1943, and only such parts thereof as necessary to an understanding of our present invention are described herein.

The engine 13 propels the driving wheels 11 through a belt 15 and transmission 16, and drives all operating parts of the combine by another belt 17 (Fig. 1); and these driving connections and controls are disclosed in detail in our co-pending application Serial No. 516,562 filed December 31, 1943. The harvester A is further raised and lowered by a power lift mechanism shown in our co-pending application Serial No. 516,564, filed December 31, 1943, and which includes as herein shown a reversible clutch unit 18 driven by a drive shaft 19 connected by a belt 20 to engine 13. The clutch unit, details of which are disclosed in said application, has a reversible output or driven shaft 21 which normally is disengaged from the drive shaft 19 but which may be caused to rotate in either direction under control of a shiftable pin 22 movable by hand lever 23 which is located convenient to the operator's station 14. Said shaft 21 operates a power lift mechanism designated generally at 24.

At the station 14 there is provided a platform 25 upon which is a seat 26 for the operator. The platform 25 is supported upon frame angles designated generally at 27, while the seat 26 is supported above the platform upon spaced upright side brackets 28. This platform is located above one driving wheel 11, and forwardly, so that the operator may view the operation of the harvester A and guide and adjust the machine accordingly, and it will be readily appreciated that in such position the operator will be enabled to see the steering truck 12 and determine the angle thereof. Thus in starting up the machine it is desirable that the operator have some means, convenient to view, for indicating the direction in which the machine will travel since otherwise he may move out of line with the swath, run into a fence if it is near, or otherwise mismanage the machine. It will further be appreciated that a machine of this nature is very heavy and cumbersome and that the constant effort of manually positioning the steering truck 12 would be very tiring.

Having in mind these facts we provide the power steering and direction indicating mechanism now to be described.

The steering truck 12 is angled by conventionally arranged steering gears 29 (Fig. 1) from which a shaft 30 extends forwardly to and beneath the platform 25. Said shaft 30 is connected at its forward end by a sprocket chain 31, and suitable sprocket gears, to a countershaft 32 supported in a bearing 33 immediately below the platform, said bearing being as shown here carried on a plate or cross member 34 secured to the rear frame angles 27.

The countershaft 32 is rotated in either of two opposite directions by a power drive consisting of a reversible clutch or clutch unit, designated generally at 35, which is mounted in tandem with the power lift clutch unit 18 and which is identical in construction thereto. The steering clutch 35 is powered by an extension 36 of the shaft 19 driving the power lift clutch 18, so that both clutches are driven by engine 13. Clutch 35 is mounted by base angles 37 upon the platform 25 with its output or driven shaft 38 extending rearwardly between the seat brackets 28 parallel to the aforesaid countershaft 32. The rear end of the shaft 38 is received in a bearing 39 in the plate 34 and carries a pinion 40 which meshes with a gear 41 upon countershaft 32. The platform 25 may be cut away as indicated at 42 to clear the gear 41.

The steering clutch 35 is, as shown, turned at an angle of ninety degrees about the axis of its drive shaft, with respect to the position of the power lift clutch 18, in order to extend its driven shaft 38 rearwardly as described.

The shifting pin 43 for the steering clutch 35 is pivotally engaged at 44 by the forked end of a lever 45 secured upon an upright steering shaft or column 46, and this shaft 46 is journaled through bearings 47 on the platform 25, from which the shaft extends upwardly, forward of the seat 26. The upper end of the steering shaft 46 has a tiller handle 48 and is journaled in a bearing 49 carried by rearwardly converging frame bars 50. It will be evident that, by turning the tiller handle 48 slightly in opposite directions, the lever 45 will reciprocate the shifting pin 43 in the clutch 35 and in response to movement of the pin in opposite direction, from a neutral position, the clutch will be engaged to rotate the shaft 38 in opposite directions. Thus it is seen that the steering truck 12 may be angled in either direction by engaging clutch 35 by slight and easy movement of the tiller handle 48. It is to be understood that the clutch 35 normally is disengaged when the shifting pin 43 is in a neutral position, corresponding to a transverse position of the tiller handle, and thus the steering truck will be left in any selected position when the tiller handle is returned to normal.

The driven shaft 38 of the steering clutch 35 is enlarged and is screw threaded, as designated at 51, for a part of its length and a non-rotatable nut member 52 is engaged with this threaded portion of the shaft. The nut member 52 is pivotally connected at 53 to the upper ends of two shifting bars or arms 54 arranged at either side thereof and depending alongside a bracket 55 secured to a cross bar 56 on the platform. Said bracket 55 carries oppositely extending pins 57 (only one of which is shown) playing in slots 58 in the bars 54 so that they may swing in fore and aft, vertical planes as the nut member 52 is shifted endwise in opposite directions on the threaded portion of the shaft 38, in response to opposite rotation thereof. Here again the platform 25 may be cut away, as seen at 59, to clear the bars 54 and permit their lower ends to depend beneath the platform.

A direction indicator shaft 60 is journaled in an upright position forwardly of the steering shaft 46 in the bearings 47—49 and at its lower end, beneath the platform 25, carries a rigidly affixed and radially extending arm 61 to which is pivotally attached at 62 the forward end of a rearwardly extending shift or link rod 63. The rear end of this rod 63 is bent upwardly and pivotally connected at 64 to one of the side bars 54 above the pivot therefor. The upper end of the shaft 60 carries a finger or arm 65 which extends in a generally forward direction.

This arrangement is such that, with the steering truck 12 in a position for straight ahead travel of the machine, the finger 65 will extend straight forwardly to indicate this condition. As the clutch shaft 38 then rotates in one direction to angle steering truck 12 and cause the machine to veer to one side, the nut member 52 will be carried in one direction along the shaft by the threads 51. The angle of the threads is so selected that this movement of the nut member 52 will swing the side bars 54 forwardly, or rearwardly as the case may be, and move the shift rod 63 endwise, swinging the arm 61, oscillating the indicator shaft 60, and turning the finger 65 to the one side to indicate the direction which the machine will now travel. The reverse movement of the shaft 38 to steer the machine toward the opposite side will, of course, move the finger 65 toward said opposite side. In each case the operator is aware of the direction in which the machine will travel, and by the angle of finger 65, will be able to judge just about how sharply angled the steering truck is positioned. The relation between the position of the finger 65 and the angle at which the machine turns may, or may not be, strictly linear, according to the various leverages involved in the linkage just described, but will be sufficiently accurate for all practical purposes.

The opposite swinging movements of the side bars 54 which are indicative of the opposite steering movements of the steering truck 12, are further employed to regulate or limit the angle to which the truck may be adjusted. For this purpose the steering shaft 46 is provided at its lower end with an arm 66 rigidly secured to and extending radially from the shaft to move therewith. The free end of arm 66 is apertured at 67 to freely and slidably receive the forward end of a link rod 68 which extends rearwardly therefrom and at its rear end is pivotally connected at 69 to the lower end portion of one of the side bars 54. The forward end of the rod 68 is provided with spaced stop pins 70 and 71 forwardly and rearwardly of the arm 66 and the arrangement acts as a lost motion connection as will be apparent. Thus as the side bars 54 swing back and forth the forward end of the rod 68 will slide freely through the end of the arm 66 but, should the side bars reach an angle such as to cause one of the stops 70 or 71 to engage the arm, then a slight continuation of such movement will swing the arm 66 and slightly rotate the steering shaft 46. The direction of such rotation is calculated to restore the steering shaft to normal, or clutch disengaging position, overriding the operator's manual control and preventing the steering truck from carelessly or inadvertently being too sharply angled in either direction, as will be understood.

Obviously the parts here shown above the platform 25 may be arranged below if desired and other changes in structure and arrangement made as required to adapt the mechanism to the machine, without departing from our invention.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a power steering mechanism including a power actuated reversible clutch and a reversibly rotating power driven shaft actuated thereby, a steering control and steering angle limiting mechanism therefor, comprising a manually operative steering shaft for engaging and disengaging the clutch, means actuated by said shaft for controlling the clutch, a swingable member responsive to relatively opposite rotations of said power driven shaft to swing in opposite directions, an arm on the steering shaft, and a link connected to said swingable member and having a lost motion connection to the said arm for moving the same to directly power actuate the steering shaft at certain positions assumed by said swingable member and thereby to disengage the clutch.

2. Steering angle indicating and limiting means for a power steering mechanism including a power driven reversible clutch and a reversibly rotatable shaft actuated by the clutch, a steering truck adapted to be angled in opposite directions by the shaft, and a steering control for engaging and disengaging the clutch, comprising a nut member threaded on the shaft and movable in opposite directions therealong responsive to relatively opposite rotations thereof, an arm supported for swinging movements adjacent the shaft and connected to said nut member for translating said movements thereof to swinging movements of the arm, a steering angle indicating member and means connecting the same to the arm for actuating the indicating member in accordance with the direction in which said arm swings, a steering angle limiting means operative upon actuation to adjust said steering control and halt the rotation of the shaft in either direction, and said limiting means being connected to the arm for stopping the rotation of the shaft in accordance with the magnitude of the swinging movements of the arm.

3. Steering angle indicating and limiting means for a power steering mechanism which includes a power source, a reversible clutch operated by the power source, a reversibly rotatable shaft operated by the clutch, and a steering truck operatively arranged for angling movements by said shaft, comprising in combination, a support, an arm swingable on said support and operatively connected to the shaft for opposite swinging movements responsive to relatively opposite rotations of said shaft, a steering position indicator, a first link member connecting the arm and indicator and operative to position the indicator in accordance with the swinging movements of the arm, a manual steering control for engaging and disengaging the clutch, and a second link member connecting the arm to said steering control and embodying a lost motion connection permitting manual operation of the control with power override when the arm swings beyond predetermined positions.

4. Steering angle indicating and limiting means for a power steering mechanism which includes a power source, a reversible clutch operated by the power source, a reversibly rotatable shaft operated by the clutch, and a steering truck operatively arranged for angling movements by said shaft, comprising in combination, a support, an arm swingable on said support and operatively connected to the shaft for opposite swinging movements responsive to relatively opposite rotations of said shaft, a steering position indicator, a first link member connecting the arm and indicator and operative to position the indicator in accordance with the swinging movements of the arm, a manual steering control for engaging and disengaging the clutch and including an oscillatable shaft, an arm on the shaft, a second link member connected at one end to the first mentioned arm and having a lost motion connection to the arm on the shaft, and stops on the said second link member for swinging the arm on the shaft and to power adjust the steering control shaft when the movement of the first mentioned arm exceeds a predetermined magnitude.

MARTIN RONNING.
KENNETH M. KEITH.